Nov. 14, 1961    A. WINKLER    3,008,397
SINGLE LENS REFLEX CAMERA
Filed March 3, 1960
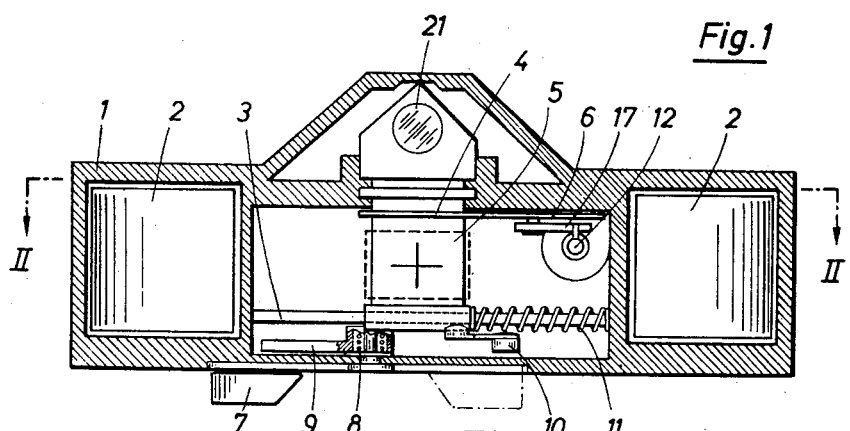
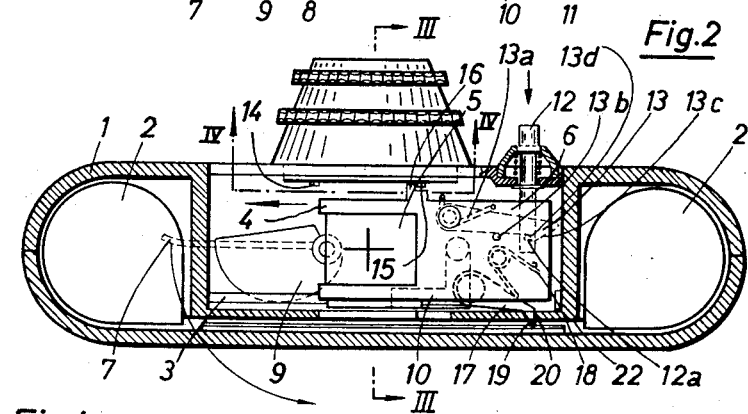
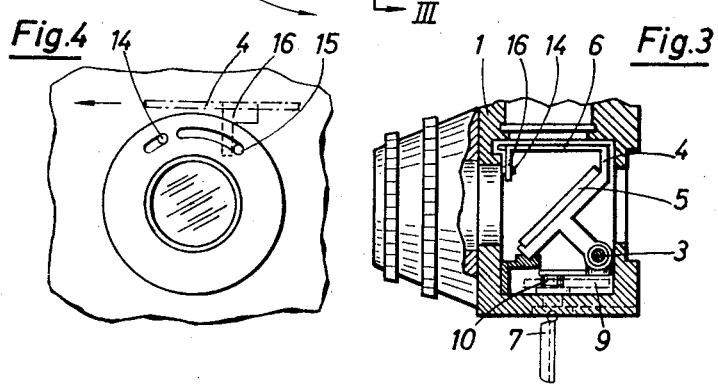
INVENTOR.
ALFRED WINKLER
BY
*Connolly and Hutz*
ATTORNEYS

United States Patent Office 3,008,397
Patented Nov. 14, 1961

3,008,397
SINGLE LENS REFLEX CAMERA
Alfred Winkler, Munich, Germany, assignor to Agfa Aktiengesellschaft, Leverkusen-Bayerwerk, Germany, a corporation of Germany
Filed Mar. 3, 1960, Ser. No. 12,576
Claims priority, application Germany Mar. 3, 1959
9 Claims. (Cl. 95—42)

This invention relates to a single lens reflex camera having a mirror which is moved out of line with the optical axis of the camera before the shutter is released and a cover plate which seals the viewfinder aperture during exposure of the film. More particularly, this invention relates to such a camera incorporating a novel film-transporting device.

In existing single lens reflex cameras, two separate mechanisms are usually provided and actuated to wind the film and condition the mirror and cover plate in preparation for an exposure. This complicates both the manufacture and operation of these cameras; and, in addition, a special interlocking device must be provided for preventing the shutter from being operated more than once without advancing the film between shutter operations and causing double exposures.

An object of this invention is to provide a single lens reflex camera having a simple and economical film-transporting device;

Another object is to provide such a camera which automatically advances the film as the movable elements of the camera are conditioned for taking an exposure;

Still another object is to provide such a camera which is conditioned for exposure by movement of a single control element; and A further object is to provide such a camera which inherently will not permit double exposures.

In accordance with this invention a single lens reflex camera includes a carrier which is mounted to move substantially in the direction of movement of its film. A film-transporting device including a film-engaging device is mounted upon this carrier, and an actuating means is operatively associated with this film-engaging device for causing it to grip the film to move it one frame as the carrier moves in one direction and for disengaging this device from the film as it moves in the other direction. At least one of the movable elements of the camera is mounted upon this carrier for causing the film to be automatically transported as the carrier moves through its path of movement in preparation for an exposure. All of the movable elements including the mirror and cover plate may be mounted upon this carrier to cause all of the movements performed in preparation for an exposure to be accomplished by actuation of a single control element. The shutter may also be set and released in response to appropriate movement of the carrier to further simplify the camera mechanism and operation, and to automatically prevent double exposures.

Novel features and advantages of the present invention will become apparent to one skilled in the art from a reading of the following description in conjunction with the accompanying drawings wherein similar reference characters refer to similar parts and in which:

FIG. 1 is a rear cross-sectional view in elevation of one embodiment of this invention;

FIG. 2 is a cross-sectional view taken through FIG. 1 along the line II—II;

FIG. 3 is a partial cross-sectional view taken through FIG. 2 along the line III—III; and FIG. 4 is a cross-sectional view taken through FIG. 2 along the line IV—IV.

In FIGS. 1, 2 and 3 is shown a camera housing 1 into which are inserted film cassettes 2 of the type which does not include a core. These cassettes are arranged on both sides of the optical system of the camera, and film 22 is transported from one cassette to the other during operation of the camera in the manner later described in detail. A carrier 4 is movably mounted upon camera housing 1, for example, upon a guide rod 3. Movable elements of the camera including, for example, a reflecting mirror 5 and a cover plate 6 for the viewfinder aperture in line with eyepiece 21 are mounted upon this carrier. A single control element 7 which is, for example, a control lever is used to condition the camera for each exposure in the manner later described in detail. In each of the figures of the drawing, the parts are shown in the cocked condition, namely with the shutter wound and the reflecting mirror inserted into the optical axis of the camera in a position to reflect rays passing through the lens into the eyepiece 21 of the viewfinder from whose aperture cover plate 6 is removed.

Operating lever 7 is connected through a shaft to cam disc 9, and a torsion spring 8 reacts against them in a direction to return lever 7 and disc 9 to the position shown in full outline in FIG. 1 when control lever 7 is released. The phantom outline illustration of lever 7 in FIG. 1 shows the position that it assumes in its fully actuated limit of travel. When lever 7 is in this fully actuated position, cam disc 9 engages a follower or striker element 10 connected to carrier 4. This causes carrier 4 to move against the compressive force exerted by spring 11 mounted upon guide rod 3 into the position shown in all the figures whereupon carrier 4 is detachably engaged with release device 12 by engagement of its latch 13 with release pin 12a. Latch 13 is resiliently urged in the direction of stop pin 13b, which is also mounted upon carrier 4 by, for example, torsion spring 13a. As carrier 4 is moved into the position shown by actuation of cam disc 9, its inclined front edge 13c easily glides over pin 12a of release bar 12, and the hook 13d formed in back of inclined edge 13c prevents return movement of carrier 4 by locking about pin 12a which releases carrier 4 only upon operation of release button 12.

The shutter is wound by movement of pin 15 to the position illustrated in FIG. 4, and it is released by movement of pin 14 away from the position shown in FIG. 4. These winding and releasing movements are actuated by contact of lug 16 mounted upon slider 4 with pins 15 and 14 in the appropriate directions of travel of carrier 4.

Film 22 is transported by a film engaging device 17 which is, for example, a pawl mounted upon carrier 4 which is resiliently biased toward film 22 by a torsion spring 18. The end of the pawl remote from the carrier is shaped as a point having wedge-forming edges 19 and 20 to permit it to engage the perforations of film 22. Edge 20 which is disposed substantially perpendicularly to film 22 causes the film to be transported as winding lever 7 is operated. Inclined rear edge 19 lifts against the resilient action of torsion spring 18 since it glides upwardly out of and across the edges of the film perforations. At the end of its rearward path of motion, lug 16 upon carrier 4 contacts release pin 14 to release the shutter.

This camera accordingly is completely conditioned for each exposure by a simple movement of lever 7 from the position shown in full outline in FIG. 1 to that shown in phantom outline. During this actuation of lever 7, mirror 5 is inserted into the optical axis to divert the rays of light passing through the objective lens of the camera into viewfinder 21 through its aperture from which cover plate 6 is removed. Also, each successive frame of film is advanced into the exposure position in back of mirror 5 as the carrier 4 moves into the position shown in all figures of the drawing. Furthermore, actuation of shutter winding projection 15 by lug 16 mounted upon the carrier winds the shutter to complete all of the operations necessary to prepare the camera for an exposure.

Upon actuation of release button 12, the carrier moves quickly in the direction of the arrow shown in FIG. 2 to move mirror 5 away from the optical axis and expose a frame of film when lug 16 strikes shutter release projection 14 upon full withdrawal of mirror 5 out of the optical axis. At the same time, cover plate 6 has covered the viewfinder aperture to seal extraneous light from the camera interior during and after exposure; and film-transporting device 17 is positioned for engaging and transporting the succeeding frame of film upon the next actuation of lever 7. This camera is, therefore, not only highly simple and economical in structure since it requires only one set of operating devices, but it also inherently prevents any double exposures from occurring because the shutter can only be actuated once after each frame of film is wound. Furthermore, more than one frame of film cannot be advanced without actuating the shutter which also inherently prevents winding of any portion of the film without having exposed it.

What is claimed is:

1. A single lens reflex camera incorporating movable elements including a mirror which is insertable across the optical axis of said camera and a cover plate which is disposable in front of the viewfinder aperture, said camera comprising a carrier, guide means mounting said carrier upon said camera to move substantially in the direction of movement of said film, a film-transporting device mounted upon said carrier, said film-transporting device including film-engaging means, an actuating means mounted upon said carrier and operatively associated with said film-engaging device for causing it to grip said film to move it one frame as said carrier moves in one direction and for disengaging said film-engaging device from said film as it moves in the other direction, at least one of said movable elements being mounted upon said carrier for causing said film to be transported as said carrier moves through its path of movement in conditioning said camera for exposure, and said mirror being mounted upon said carrier.

2. A camera as set forth in claim 1 wherein said film-engaging device comprises a pawl extending from said carrier in the direction of movement of said film, the end of said pawl remote from said carrier being shaped to a point which is small enough to engage the perforations in said film, and said actuating means comprising resilient means biasing said pawl toward said film to cause it to engage said perforations when said carrier moves in the direction of movement of said film and to permit said point to be withdrawn and disengaged from said perforations when said carrier moves away from the direction of movement of said film.

3. A camera as set forth in claim 1 wherein latching means locks said carrier in its extremity of movement to prepare said camera for exposing a frame of said film.

4. A single lens reflex camera incorporating movable elements including a mirror which is insertable across the optical axis of said camera and a cover plate which is disposable in front of the viewfinder aperture, said camera comprising a carrier, guide means mounting said carrier upon said camera to move substantially in the direction of movement of said film, a film-transporting device mounted upon said carrier, said film-transporting device including film-engaging means, an actuating means mounted upon said carrier and operatively associated with said film-engaging device for causing it to grip said film to move it one frame as said carrier moves in one direction and for disengaging said film-engaging device from said film as it moves in the other direction, at least one of said movable elements being mounted upon said carrier for causing said film to be transported as said carrier moves through its path of movement in conditioning said camera for exposure, and said cover plate being mounted upon said carrier.

5. A single lens reflex camera incorporating movable elements including a mirror which is insertable across the optical axis of said camera and a cover plate which is disposable in front of the viewfinder aperture, said camera comprising a carrier, guide means mounting said carrier upon said camera to move substantially in the direction of movement of said film, a film-transporting device mounted upon said carrier, said film-transporting device including film-engaging means, an actuating means mounted upon said carrier and operatively associated with said film-engaging device for causing it to grip said film to move it one frame as said carrier moves in one direction and for disengaging said film-engaging device from said film as it moves in the other direction, at least one of said movable elements being mounted upon said carrier for causing said film to be transported as said carrier moves through its path of movement in conditioning said camera for exposure, and both said mirror and said cover plate being mounted upon said carrier.

6. A single lens reflex camera incorporating movable elements including a mirror which is insertable across the optical axis of said camera and a cover plate which is disposable in front of the viewfinder aperture, said camera comprising a carrier, guide means mounting said carrier upon said camera to move substantially in the direction of movement of said film, a film-transporting device mounted upon said carrier, said film-transporting device including film-engaging means, an actuating means mounted upon said carrier and operatively associated with said film-engaging device for causing it to grip said film to move it one frame as said carrier moves in one direction and for disengaging said film-engaging device from said film as it moves in the other direction, at least one of said movable elements being mounted upon said carrier for causing said film to be transported as said carrier moves through its path of movement in conditioning said camera for exposure, said camera incorporating a shutter and a shutter-setting device, and said shutter-setting device having a projection which extends into the path of movement of said carrier and is engageable thereby to set said shutter when said carrier moves in the direction of movement of said film whereby said shutter is automatically cocked as said carrier moves in said direction of movement of said film.

7. A camera as set forth in claim 6 wherein all of said movable elements are mounted upon said carrier, and manually-actuable drive means is mounted upon said camera and operatively associated with said carrier for moving it in the direction of movement of said film thereby simultaneously setting said movable elements in position for actuating an exposure of a frame of said film and setting said shutter.

8. A camera as set forth in claim 6 wherein said shutter also includes an actuating means which is disposed in the path of movement of said carrier when it is opposite to the direction of movement of said film whereby an exposure is automatically actuated when said carrier moves said mirror away from the optical axis of said camera.

9. A camera as set forth in claim 7 wherein said manually-actuable drive means comprises a rotatable lever and a cam, and follower means extends from said carrier into the path of movement of said cam.

References Cited in the file of this patent
UNITED STATES PATENTS
2,100,008   Stephens _____ Nov. 23, 1937